United States Patent
Park et al.

(10) Patent No.: US 7,012,113 B2
(45) Date of Patent: Mar. 14, 2006

(54) POLYOLEFIN RESIN COMPOSITION FOR WHEEL COVER OF AN AUTOMOBILE

(75) Inventors: Bong-Hyun Park, Kyoungki-do (KR); Sung-Jun Lee, Kyoungki-do (KR); Won-Bum Jung, Taejeon (KR); Kyoung-Suk Chae, Taejeon (KR)

(73) Assignees: Hyundai Motor Company, Seoul (KR); Samsung Atofina Co. Ltd., Seosan-Si (KR)

(*) Notice: Subject to any disclaimer, the term of this patent is extended or adjusted under 35 U.S.C. 154(b) by 533 days.

(21) Appl. No.: 10/076,179

(22) Filed: Feb. 12, 2002

(65) Prior Publication Data

US 2003/0022975 A1 Jan. 30, 2003

(30) Foreign Application Priority Data

Jun. 19, 2001 (KR) ................................ 2001-34743

(51) Int. Cl.
*C08K 3/30* (2006.01)
(52) U.S. Cl. ........................ 524/423; 524/494; 524/505
(58) Field of Classification Search ................ 524/423, 524/494, 505
See application file for complete search history.

(56) References Cited

U.S. PATENT DOCUMENTS 6,689,841 B1 * 2/2004 Jung et al. .................. 525/240

FOREIGN PATENT DOCUMENTS

| JP | 6-80839 | 3/1994 |
| JP | 10-44701 | 2/1998 |

* cited by examiner

*Primary Examiner*—Edward J. Cain
(74) *Attorney, Agent, or Firm*—Morgan Lewis & Bockius LLP

(57) ABSTRACT

A polyolefin resin composition suitable for use in a wheel cover of an automobile including a high-crystalline olefin resin, a polyolefin based elastomer, and an inorganic filler chosen from glass beads coated with a polypropylene grafted with unsaturated carbonic acid or its anhydride and barium sulfate, which is excellent in rigidity, impact strength, heat resistance, mechanical strength, moldability during injection molding, coatability, and appearance without protuberance on the welds and thus suitable for a wheel cover of an automobile.

19 Claims, No Drawings

POLYOLEFIN RESIN COMPOSITION FOR WHEEL COVER OF AN AUTOMOBILE

FIELD OF THE INVENTION

The present invention relates to a polyolefin resin composition for a wheel cover of an automobile. More particularly, it relates to a polyolefin resin composition comprising a high-crystalline olefin resin, a polyolefin based elastomer, and an inorganic filler chosen from glass beads coated with a polypropylene grafted with unsaturated carbonic acid or its anhydride and barium sulfate, which is excellent in rigidity, impact strength, heat resistance, mechanical strength, moldability during injection molding, coatability, and appearance without protuberance on the welds and thus suitable for a wheel cover of an automobile. The invention also relates to the wheel cover.

BACKGROUND OF THE INVENTION

Polypropylene resins have been widely used in various fields due to relatively desirable price, lightweight and excellent mechanical strength. However, polypropylene resins exhibit unsatisfactory impact strength and rigidity. To overcome this deficiency, a polypropylene resin composition containing ethylene-propylene copolymer rubber (EPM) and talc as an inorganic filler has been proposed.

Conventional wheel covers of automobiles have been produced by press molding with steel. Recently, nylons and polyvinylphenylene oxides having excellent heat resistance have been used for lightening the weight of automotive materials. However, use of these polymers has been a burden due to high cost to use such materials.

Therefore, it has been proposed to use reinforced polyolefin resin compositions such as polypropylene for a low cost. For example, Japanese Laid-open publication no. 6-80839 discloses a wheel cover produced by injection molding of a fiber-reinforced polypropylene resin composition comprising polypropylene, polypropylene having carboxylic acids, silan-treated glass fiber and polyethylene wax. Further, Japanese Laid-open publication no. 10-44701 discloses a wheel cover comprising polyolefin composition made of a crystalline propylene-ethylene block copolymer, an ethylene-propylene copolymer rubber, a polypropylene resin modified with unsaturated carbonic acid or its derivative, talc having less than 10 $\mu$m of an average particle diameter, and glass fiber.

Said polypropylene resin compositions for wheel covers use glass fiber to reinforce rigidity and inorganic talc to improve rigidity, impact resistance, and heat resistance. However, the most serious problem in the employment of them with respect to wheel covers is that they have a poor surface appearance quality due to protuberance on the welds.

SUMMARY OF THE INVENTION

Accordingly, an object of the present invention is to provide a polyolefin resin composition comprising a high crystalline olefin resin, a polyolefin based elastomer, and an inorganic filler chosen from glass beads coated with a polypropylene grafted with unsaturated carbonic acid or its anhydride and barium sulfate, so that the result is suitable for wheel covers due to excellent rigidity, impact resistance, heat resistance, and mechanical strength, moldability, coatability, and appearance without protuberance on the welds.

DETAILED DESCRIPTION OF THE INVENTION

The present invention is described in more detail set forth hereunder. The present invention provides a polyolefin resin composition for the automotive wheel cover comprising 40–75 wt. % of a high crystalline olefin resin, 3–25 wt. % of a polyolefin based elastomer and 5–30 wt. % of an inorganic filler.

High crystalline olefin resin used in the resin composition of the present invention has a melt index of 10–80 g/10 min (ASTM D 1238, 230° C.), preferably 20–60 g/10 min. The propylene component has an isotactic pentad fraction of not less than 96%, for example between 97% and 100%, such as 99%. The high crystalline olefin resin improves flowability of olefin based elastomer and further improves the heat resistance, mechanical strength and thermal distortion. When the high crystalline olefin resin is used less than 40 wt. %, there is limitation to enhance heat resistance, mechanical strength and thermal distortion. On the other hand, when an isotactic pentad fraction of the polypropylene component is less than 96%, the properties of the high crystalline olefin resin such as rigidity, impact resistance, heat resistance and mechanical strength are deteriorated and the wheel cover obtained therefrom also has inferior heat resistance and mechanical strength.

Examples of the high crystalline olefin resin include a copolymer, random copolymer and a mixture thereof between propylene and a small amount of another α-olefin selected from isotactic polypropylene, propylene-ethylene copolymer, propylene-1-butane copolymer, propylene-1-hexene copolymer, and propylene-4-mehtyl-1-pentene copolymer. By small amount it is meant less than about 30%, typically less than about 20%, for example less than about 10% by weight.

The amount of high crystalline olefin resin is between 40% to 75 wt. %, for example between 50% and 65 wt. % by weight.

The polyolefin-based elastomer used in the resin composition of the present invention has a the Mooney viscosity $ML_{1+4}$ (100° C.) of 10–100, preferably 20–70; a melt index of 0.5–10 g/10 min (230° C., 2.16 Kg), for example from about 3 to about 8 g/10 min (230° C., 2.16 Kg); and a co-monomer content of 10–40 wt. %, preferably 20–30 wt. %. The polyolefin based elastomer is used to provide an elasticity and flexibility and improve impact resistance, dispersion, and coatability. If a rubber having a Mooney viscosity of less than 10 is used, although the flowability is improved, the mechanical properties are inferior. On the other hand, if a rubber having a Mooney viscosity of higher than 100 is used, although the mechanical properties are improved, the flowability is inferior.

The polyolefin based elastomer is chosen in one or more from ethylene-propylene copolymer rubber, ethylene-propylene-dicyclopentadiene rubber, ethylene-propylene-1,4-hexadiene rubber, ethylene-propylene cyclopentadiene rubber, ethylene-propylene-methylene-norbornane rubber, and ethylene-propylene-ethylidene-norbornane rubber. Also, the polyolefin based elastomer is chosen from hydrogenated styrene-butylene block copolymer (SEBS), hydrogenated styrene-butadiene rubber (HSBR), styrene-ethylene-butylene block copolymer (SEBC) and crystalline ethylene-butylene block copolymer (CEBC).

The polyolefin based elastomer is used in the range of 3 to 25 wt. %, for example between 8 and 19 wt. %. When it is used less than 3 wt. %, the impact resistance at a low temperature may be decreased. When it is used more than 25 wt. %, although the impact resistance is improved, the heat resistance and mechanical strength are decreased.

Inorganic filled used in the resin composition of the present invention is chosen from spherical glass beads, barium sulfate, and a mixture thereof and used in the range of 5–30 wt. %, preferably 10–25 wt. %. When it is used less than 5 wt. %, the heat resistance and mechanical strength may be decreased during the molding process for the automotive wheel cover and the appearance quality is inferior due to protuberance on the welds. When it is used more than 30 wt. %, although the heat resistance and mechanical strength are good, the impact resistance is decreased and the molecular weight of the molded wheel cover is increased.

The glass beads preferably have an average particle diameter of 15–45 $\mu$m, more preferably 20–40 $\mu$m, to improve the protuberance on the weld lines. When the average particle diameter is less than 15 $\mu$m, the appearance quality is inferior due to protuberance on the welds. When the average particle diameter is more than 45 $\mu$m, although the mechanical strength and heat resistance are improved, the impact resistance is decreased.

Furthermore, the glass beads may be treated to improve the coatability and adhesion of the surface of the inorganic filler to the resin composition. It is preferred to use surface coated-glass beads, wherein the surface treatment increases comparability or adhesion to the resin composition. A preferred treatment of glass beads is coating them with a polypropylene grafted with unsaturated carbonic acid or its anhydride. The modified polypropylene for coating the surface of glass beads is prepared by melt-kneading a crystalline polypropylene, unsaturated carbonic acid or its anhydride and a catalyst with a twin-screw extruder at 180–220° C. The coating to glass beads can be in a weight ratio range of from about 1:1 to about 1:25, but is preferably 1:6 to 1:12, for example 1:9. In one embodiment, the modified polypropylene and glass beads having an average particle diameter of 15–45 $\mu$m were mixed in a ratio of 1 to 9 and melt-kneaded for coating the surface of the glass beads.

Barium sulfate used in the resin composition of the present invention has an average particle diameter of 0.1 to 5 $\mu$m, preferably 0.5–1 $\mu$m. When the average particle diameter is less than 0.5 $\mu$m, the composition does not mix well. When the average particle diameter is more than 1 $\mu$m, the appearance quality of the weld is inferior.

When the barium sulfate is used with the surface-modified glass beads, i.e., coated with the modified polypropylene, it exhibits a superior effect of improving the protuberance on the welds of automotive wheel covers.

Other additives, used by one having ordinary skill in the art, such as a reinforcing agent, a heat stabilizer, a weather stabilizer, an anti-static agent, a lubricant, a neutralizer, a flame retardant, wollastonite, calcium carbonate, mica, kaolin, clay, and calcium sulfate may be arbitrarily incorporated in an appropriate content not to obstruct the above-mentioned object of the present invention.

In a less preferred embodiment, glass beads may be used with other inorganic fillers, for example wollastonite, calcium carbonate, mica, kaolin, clay, and calcium sulfate.

The following examples are intended to further illustrate the present invention without limiting its scope.

Symbols used in Examples and Comparative Examples are as follows:

1) Polypropylene
   PPI-1: a melt index of 30 g/10 min(230° C.), a content of ethylene of 10.5 mol %, and an isotactic pentad fraction of not higher than 96% measured by NMR.
   PPI-2: a melt index of 30 g/10 min(230° C.), a content of ethylene of 10.5 mol %, and an isotactic pentad fraction of not less than 96% measured by NMR.
   PPI-3: a melt index of 30 g/10 min(230° C.), a content of ethylene of 5.6 mol %, and an isotactic pentad fraction of not less than 96% measured by NMR.

2) Polyolefin Based Elastomer (EPM)
   EB-1: Ethylene-propylene copolymer rubber, a Mooney viscosity $ML_{1+4}$ (100° C.) of 70, and a propylene content of 27 wt. %.
   EB-2: Hydrogenated styrene-butadiene block copolymer, a flow rate of 1.5 (230° C., 2.16 Kg), and a styrene content of 20 wt. %.
   EB-3: Ethylene-butene copolymer rubber, a Mooney viscosity $ML_{1+4}$ (100° C.) of 44, and a butene content of 20 wt. %.

3) Surface-Coated Glass Beads with a Modified Polypropylene Resin
   GB-1: Surface-coated glass beads with a weight ratio of modified polypropylene resin: glass beads of 1:9.

4) Barium Sulfate (BaSO4)
   $BaSO_4$: Barium sulfate having an average particle diameter of 0.5–1$\mu$m.

5) Glass Fiber
   GF: Glass fiber having a length of 9 $\mu$m.

6) Inorganic Filler: Talc
   Talc: Talc having an average particle diameter of 4 $\mu$m.

7) Modified Polypropylene Resin
   CP: Modified polypropylene resin grafted with maleic anhydride (modified rate=0.4)

EXAMPLES 1–4 AND COMPARATIVE EXAMPLES 1–4

The components and contents as in the Table 1 were mixed (glass fiber and glass beads were added from the side of the extruder). The composition was dried at 80° C. for 2 hours to remove moisture therein. The molded articles for testing were obtained by injection molding under an injection temperature of 200° C., a molding temperature of 60° C. and an injection pressure of 60–100 bar.

Physical properties of the polyolefin resin composition prepared from Examples 1–4 and Comparative Examples 1–4 were tested by the following methods. The result is shown in Table 2.

Test Method
   A. Flexural modulus (MPa): Tested with ASTM D790A.
   B. Izod impact resistance (kg·cm/cm$^2$): Tested with ASTM D256 at 23□.
   C. Thermal distortion temperature (□): Tested with ASTM D656.
   D. Attachment-detachment repetition test: Attachment of each wheel cover to a wheel disc and detachment were repeated for 30 times and the occurrence of a trouble such as cracking was investigated.
   E. Falling ball test: A steel ball was gravity-dropped on the decorative surface of each wheel cover at −30° C.

F. Protuberance on the weld: Measured for the thickness of the weld (when the thickness was higher than 10 μm, it was failed).

TABLE 1

| Category | Example | | | | Comparative Example | | | |
|---|---|---|---|---|---|---|---|---|
| (wt. %) | 1 | 2 | 3 | 4 | C-5 | C-6 | C-7 | C-8 |
| PPI-1 | — | — | — | — | — | 57 | 63 | — |
| PPI-2 | 65 | — | 65 | 63 | 60 | — | — | 60 |
| PPI-3 | — | 63 | — | — | — | — | — | — |
| EB-1 | — | — | 15 | — | — | 15 | — | — |
| EB-2 | 15 | — | — | — | 15 | — | — | — |
| EB-3 | — | 12 | — | — | — | — | 12 | — |
| EB-4 | — | — | — | 17 | — | — | — | 15 |
| GB-1 | 10 | 5 | 15 | 5 | — | — | — | — |
| BaSO$_4$ | 10 | 20 | 5 | 15 | — | — | 25 | — |
| Talc | — | — | — | — | 20 | 20 | — | 10 |
| GF | — | — | — | — | — | 5 | — | 15 |
| CP | — | — | — | — | 5 | 3 | — | — |

TABLE 2

| Category | Example | | | | Comparative Example | | | |
|---|---|---|---|---|---|---|---|---|
| | 1 | 2 | 3 | 4 | C-5 | C-6 | C-7 | C-8 |
| Flexural modulus (MPa) | 3000 | 2400 | 3200 | 2100 | 2100 | 2050 | 1780 | 2500 |
| Izod impact resistance (kg · cm/cm$^2$) | 22 | 20 | 20 | 20 | 28 | 19 | 15 | 21 |
| Thermal distortion temperature (□) | 155 | 135 | 155 | 145 | 130 | 135 | 115 | 155 |
| Attachment-detachment repetition test | ○ | ○ | ○ | ○ | ○ | ○ | X | ○ |
| Falling ball test for cracking | ○ | ○ | ○ | ○ | ○ | ○ | X | ○ |
| Appearance of the wheel cover | ○ | ○ | ○ | ○ | ○ | ○ | ○ | ○ |
| Welds Appearance | ○ | ○ | ○ | ○ | X | X | ○ | X |
| Protuberance height (μm) | 5.8 | 1.2 | 6.2 | 2.3 | 62 | 43 | 7.2 | 34 |

○: Good, X: Poor

As shown in Table 2, the polyolefin resin compositions of Examples 1–4 have excellent rigidity, impact resistance, heat resistance, attachment-detachment strength, and falling impact resistance and especially. Further, the weld appearances are superior and the protuberance height is not greater than 10 μm, preferably not greater than about 6 μm.

Although the polyolefin resin compositions of Comparative Examples 5, 6, and 8 show excellent rigidity and impact resistance, the appearance on the welds are poor and the protuberance heights are higher than 20 μm. Although the polyolefin resin compositions of Comparative Example 3 provides good weld appearance with not higher than 10 μm of protuberance height, this composition shows poor rigidity, heat resistance, attachment-detachment strength, and falling impact resistance.

In some embodiments, the weight ratio of glass beads, especially surface-treated glass beads, to the inorganic filler with an average particle diameter of less than 1 micron, preferably particulate BaSO4, is between about 6:1 to about 1:10, preferably between about 2:1 to about 4:1.

As described above, the polyolefin resin composition of the present invention provides excellent rigidity, impact strength, heat resistance, mechanical strength, moldability, coatability, and appearance without protuberance on the welds and thus suitable for a wheel cover of an automobile.

What is claimed is:

1. A polyolefin resin composition for an automotive wheel cover comprising 40–75 wt. % of a high crystalline olefin resin, 3–25 wt. % of a polyolefin based elastomer, and 5–30 wt. % of an inorganic filler, wherein said inorganic filler is chosen from glass beads, barium sulfate, and a mixture thereof.

2. A polyolefin resin composition of claim 1, wherein said high crystalline olefin resin has a melt index of 10–80 g/10 min and the propylene component has an isotactic pentad fraction of not less than 96%.

3. A polyolefin resin composition according to claim 1, wherein said high crystalline olefin resin is chosen from a copolymer, random copolymer and a mixture thereof between propylene and a small amount of another α-olefin chosen from an isotactic polypropylene, a propylene-ethylene copolymer, a propylene-1-butane copolymer, a propylene-1-hexene copolymer, and a propylene-4-mehtyl-1-pentene copolymer.

4. A polyolefin resin composition according to claim 2, wherein said high crystalline olefin resin is chosen from a copolymer, random copolymer and a mixture thereof between propylene and a small amount of another α-olefin chosen from an isotactic polypropylene, a propylene-ethylene copolymer, a propylene-1-butane copolymer, a propylene-1-hexene copolymer, and a propylene-4-mehtyl-1-pentene copolymer.

5. A polyolefin resin composition according to claim 1, wherein said polyolefin based elastomer has a Mooney viscosity $ML_{1+4}$ (100° C.) of 10–100 and a comonomer content of 10–40 wt. %.

6. A polyolefin resin composition according to claim 1, wherein said polyolefin based elastomer is chosen from an ethylene-propylene copolymer rubber, an ethylene-propylene-dicyclopentadiene rubber, an ethylene-propylene-1,4-hexadiene rubber, an ethylene-propylene cyclopentadiene rubber, an ethylene-propylene-methylene-norbomane rubber, an ethylene-propylene-ethylidene-norbornane rubber, a hydrogenated styrene-butylene block copolymer (SEBS), a hydrogenated styrene-butadiene rubber (HSBR), astyreneethylene-butylene block copolymer (SEBC), a crystalline ethylene-butylene block copolymer (CEBC), or a mixture thereof.

7. A polyolefin resin composition according to claim 5, wherein said polyolefin based elastomer is chosen from an ethylene-propylene copolymer rubber, an ethylene-propylene-dicyclopentadiene rubber, an ethylene-propylene-1,4-hexadiene rubber, an ethylene-propylene cyclopentadiene rubber, an ethylene-propylene-methylene-norbomane rubber, an ethylene-propylene-ethylidene-norbornane rubber, a hydrogenated styrene-butylene block copolymer (SEBS), a hydrogenated styrene-butadiene rubber (HSBR), astyrene-ethylene-butylene block copolymer (SEBC), a crystal line ethylene-butylene block copolymer (CEBC), and a mixture thereof.

8. A polyolefin resin composition according to claim 1, wherein said glass beads has an average particle diameter of 15–45 μm and is coated on the surface with a polypropylene grafted with unsaturated carbonic acid or its anhydride.

9. A polyolefin resin composition according to claim 1, wherein said barium sulfate has an average particle diameter of 0.5–1 μm.

10. An automobile wheel cover comprising a polyolefin resin composition, said composition comprising:
   between 40 and 75 wt. % of a high crystalline olefin resin having a propylene component that has an isotactic pentad fraction of not less than 96 %, wherein said high crystalline olefin resin has a melt index of 10–80 g/10 min at 230° C.; between 3 and 25 wt. % of a polyolefin-based elastomer; and between 5 and 30 wt. % of an inorganic filler comprising a first component with an average particle size between 15 and 45 μm and a second component with an average particle size between 0.5 and 2 μm.

11. The automobile wheel cover of claim 10 wherein
   the high crystalline olefin resin comprises polypropylene, a copolymer of propylene and less than about 20% of an α-olefin chosen from isotactic polypropylene, ethylene copolymer, 1-butylene, 1-hexene, or 4-methyl-1-pentene, or a mixture thereof, and
   the inorganic filler comprises glass beads having an average particle diameter of 15 to 45 μm and a second inorganic filler with an average particle diameter of 0.5 to 1 μm, and wherein the weight ratio of glass beads to the second inorganic filler is between about 6:1 to about 1:10.

12. The automobile wheel cover of claim 11 wherein the second inorganic filler component comprises barium sulfate, and wherein the weight ratio of glass beads to the second inorganic filler is between about 2:1 to about 4:1.

13. The automobile wheel cover of claim 10 wherein the inorganic filler comprises
   glass beads having an average particle diameter of 15 to 45 μm, where at least a portion of the glass beads have been coated on the surface with a polypropylene grafted with unsaturated carbonic acid or its anhydride, and
   barium sulfate with an average particle diameter of 0.5 to 1 μm, wherein the weight ratio of glass beads to barium sulfate is between about 6:1 to about 1:10.

14. The automobile wheel cover of claim 11 wherein the glass beads have an average particle diameter of 20 to 40 μm and have been coated on the surface with a surface treatment that increases adhesion to the resin composition, wherein the weight ratio of the surface treatment to the glass beads is between 1:6 and 1:25.

15. The automobile wheel cover of claim 12 wherein the glass beads have been coated on the surface polypropylene grafted with unsaturated carbonic acid or its anhydride, and wherein the weight ratio of glass beads to barium sulfate is between about 6:1 to about 1:10.

16. The automobile wheel cover of claim 12 wherein the polyolefin based elastomer is chosen from an ethylene-propylene copolymer rubber, an ethylene-propylene-dicyclopentadiene rubber, an ethylene-propylene-1,4-hexadiene rubber, an ethylene-propylene cyclopentad iene rubber, an ethylene-propylene-methylene-norbornane rubber, an ethylene-propylene-ethylidene-norbornane rubber, a hydrogenated styrene-butylene block copolymer (SEBS), a hydrogenated styrene-butadiene rubber (HSBR), astyrene-ethylene-butylene block copolymer (SEBC), a crystalline ethylene-butylene block copolymer (CEBC), or a mixture of two or more thereof.

17. The automobile wheel cover of claim 10 wherein
   the high crystalline olefin resin comprises polypropylene, a copolymer of propylene and less than about 20% of an α-olefin chosen from isotactic polypropylene, ethylene copolymer, 1-butylene, 1-hexene, or 4-methyl-1-pentene, or a mixture thereof, and
   the inorganic filler comprises glass beads having an average particle diameter of 15 to 45 μm and a second inorganic filler with an average particle diameter of 0.5 to 1 μm, and wherein the weight ratio of glass beads to the second inorganic filler is between about 2:1 to about 4:1.

18. A polyolefin resin composition, said composition comprising:
   between 40 and 75 wt. % of a high crystalline olefin resin having a propylene component that has an isotactic pentad fraction of not less than 96%, wherein said high crystalline olefin resin has a melt index of 10 to 80 g/10 min at 230° C.;
   between 3 and 25 wt. % of a polyolefin-based elastomer, wherein the elastomer is chosen from an ethylene-propylene copolymer rubber, an ethylene-propylene-dicyclopentadiene rubber, an ethylene-propylene-1,4-hexadiene rubber, an ethylene-propylene cyclopentadiene rubber, an ethylene-propylene-methylene-norbornane rubber, an ethylene-propylene-ethylidene-norbornane rubber, a hydrogenated styrene-butylene block copolymer (SEBS), a hydrogenated styrene-butad iene rubber (HSBR), astyrene-ethylene-butylene block copolymer (SEBC), a crystalline ethylene-butylene block copolymer (CEBC), or a mixture of two or more thereof; and
   between 5 and 30 wt. % of an inorganic filler, wherein the inorganic filler comprises glass beads having an average particle diameter of 15 to 45 μm and a second inorganic filler component with an average particle diameter of 0.5 to 1 μm, wherein the weight ratio of glass beads to second inorganic filler component is between about 6:1 to about 1:10.

19. The polyolefin resin composition of claim 18 wherein the second inorganic filler component comprises barium sulfate, the weight ratio of glass beads to the second inorganic filler is between about 2:1 to about 4:1, and where at least a portion of the glass beads have been coated on the surface with a polypropylene grafted with unsaturated carbonic acid or its anhydride.

* * * * *